(12) United States Patent
Takemura et al.

(10) Patent No.: US 8,077,234 B2
(45) Date of Patent: Dec. 13, 2011

(54) IMAGE PICKUP DEVICE AND METHOD FOR PROCESSING AN INTERPOLATED COLOR SIGNAL

(75) Inventors: Yasuo Takemura, Tokyo (JP); Hiroto Honda, Yokohama (JP); Kazuhito Sasaki, Tokyo (JP); Tatsuya Shimoike, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 601 days.

(21) Appl. No.: 12/179,976

(22) Filed: Jul. 25, 2008

(65) Prior Publication Data
US 2009/0027534 A1 Jan. 29, 2009

(30) Foreign Application Priority Data

Jul. 27, 2007 (JP) ................................ 2007-196472
Apr. 17, 2008 (JP) ................................ 2008-108014

(51) Int. Cl.
*H04N 3/14* (2006.01)
*H04N 5/335* (2011.01)
*H04N 9/04* (2006.01)
*G06K 9/00* (2006.01)

(52) U.S. Cl. ........................................ 348/280; 382/167
(58) Field of Classification Search .................. 348/272, 348/273, 280; 382/167
See application file for complete search history.

(56) References Cited

U.S. PATENT DOCUMENTS

| 4,642,678 A * | 2/1987 | Cok | 348/242 |
|---|---|---|---|
| 5,652,621 A * | 7/1997 | Adams et al. | 348/272 |
| 6,642,962 B1 * | 11/2003 | Lin et al. | 348/252 |
| 6,744,916 B1 * | 6/2004 | Takahashi | 382/162 |
| 6,836,289 B2 * | 12/2004 | Koshiba et al. | 348/273 |
| 6,897,425 B2 * | 5/2005 | Osada | 250/208.1 |
| 6,912,004 B1 * | 6/2005 | Knudsen et al. | 348/273 |
| 6,914,628 B1 * | 7/2005 | Kuwata et al. | 348/272 |

(Continued)

OTHER PUBLICATIONS

Lukac et al.; "Normalized Color-Ratio Modeling for CFA Interpolation"; 2004; IEEE; pp. 737-745.*
Hiroto Honda, et al. "A Novel Bayer-Like WRGB Color Filter Array for CMOS Image Sensors", Proc. of SPIE-IS&T Electronic Imaging, SPIE vol. 6492, 2007, pp. 64921J-1 to 64921J-10.
Hiroto Honda, et al. "High Sensitivity Color CMOS Image Sensor with WRGB Color Filter Array and Color Separation Process Using Edge Detection", International Image Sensor Workshop, Jun. 7-10, 2007, pp. 263-266.
"Kodak High Sensitivity Image Sensor Tech", News Release from Eastman Kodak, Digital Photography Review, Jun. 14, 2007, 6 Pages.

*Primary Examiner* — John Villecco
(74) *Attorney, Agent, or Firm* — Oblon, Spivak, McClelland, Maier & Neustadt, L.L.P.

(57) ABSTRACT

An image pickup device has a signal processing part configured to perform signal process for the first to third color signals. The signal processing part includes a first color generator configured to generate a fourth color signal corresponding to a reference pixel based on a ratio between a second color signal at a pixel located in vicinity of the reference pixel and a first color signal at a pixel located in vicinity of the reference pixel, a second color generator configured to generate a fifth color signal corresponding to the reference pixel based on a ratio between a third color signal at a pixel located in vicinity of the reference pixel and the first color signal at a pixel located in vicinity of the reference pixel, and a image quality converter configured to generate color signals by performing a predetermined image process based on the first to fifth color signals.

18 Claims, 16 Drawing Sheets

U.S. PATENT DOCUMENTS

| | | | |
|---|---|---|---|
| 7,148,925 B2 * | 12/2006 | Osada et al. | 348/275 |
| 7,236,628 B2 * | 6/2007 | Chen et al. | 382/167 |
| 7,605,848 B2 * | 10/2009 | Lee et al. | 348/223.1 |
| 7,714,900 B2 * | 5/2010 | Chiu | 348/222.1 |
| 7,728,882 B2 * | 6/2010 | Jaspers | 348/223.1 |
| 7,792,356 B2 * | 9/2010 | Sato et al. | 382/167 |
| 7,990,447 B2 * | 8/2011 | Honda et al. | 348/294 |
| 2005/0094007 A1 * | 5/2005 | Nomura et al. | 348/272 |
| 2006/0146150 A1 * | 7/2006 | Kang | 348/272 |
| 2006/0170798 A1 * | 8/2006 | Lee et al. | 348/272 |
| 2007/0165113 A1 * | 7/2007 | Suzuki | 348/223.1 |
| 2008/0068477 A1 | 3/2008 | Iida et al. | |
| 2008/0180557 A1 | 7/2008 | Egawa et al. | |
| 2008/0211943 A1 | 9/2008 | Egawa et al. | |

* cited by examiner

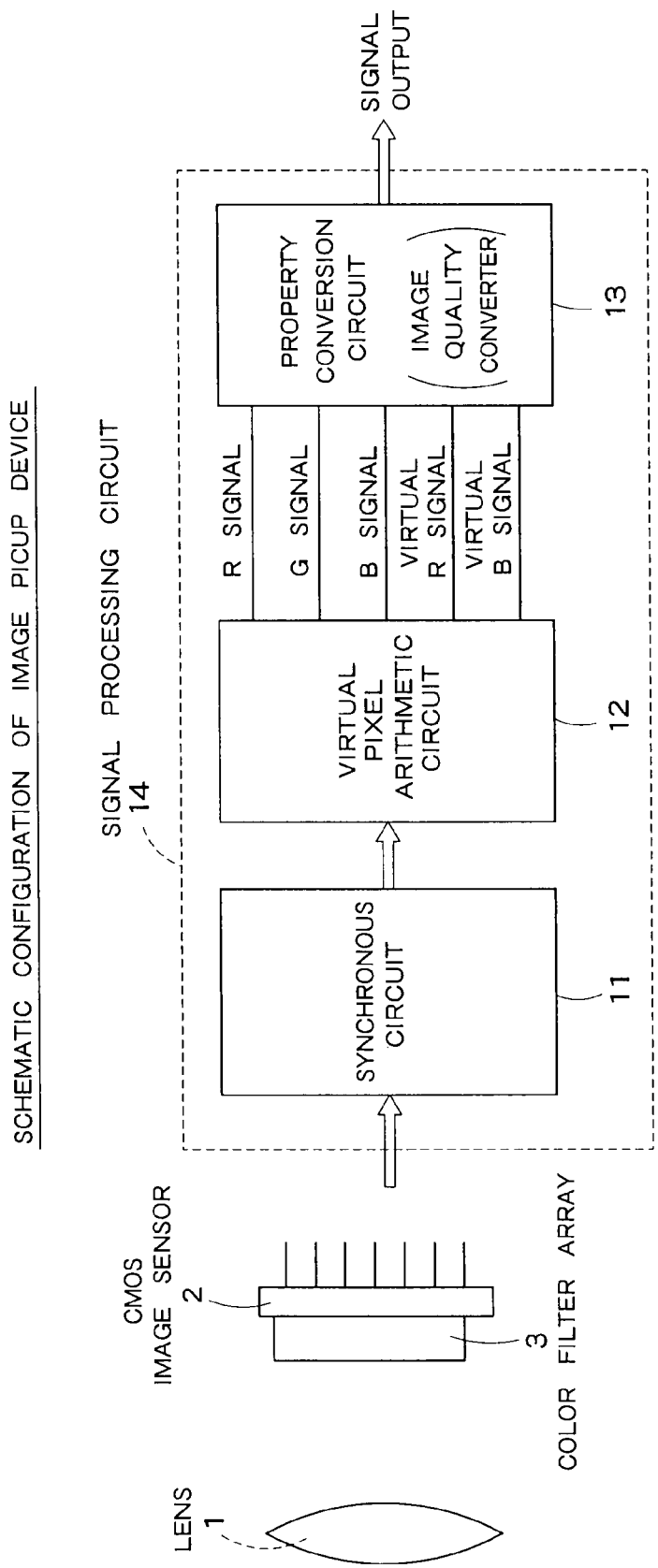
F I G. 1

COLOR FILTER ARRAY IN RGB-BAYER METHOD
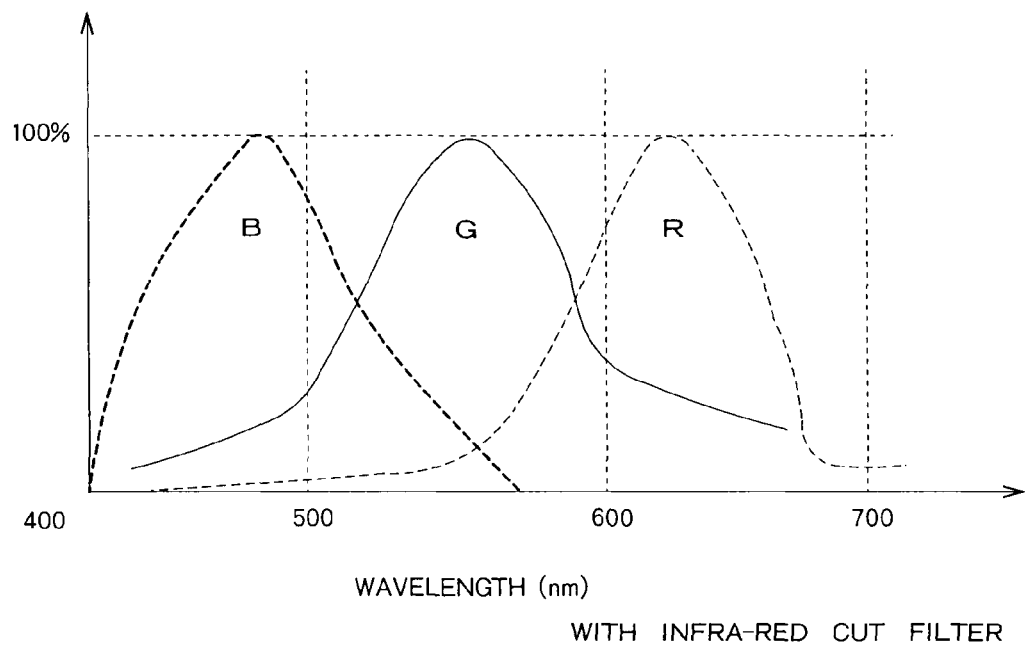
| $G_{11}$ | $R_{12}$ | $G_{13}$ | $R_{14}$ |
| --- | --- | --- | --- |
| $B_{21}$ | $G_{22}$ | $B_{23}$ | $G_{24}$ |
| $G_{31}$ | $R_{32}$ | $G_{33}$ | $R_{34}$ |
| $B_{41}$ | $G_{42}$ | $B_{43}$ | $G_{44}$ |
F I G. 2
WAVELENGTH CHARACTERISTICS OF RGB COLOR FILTER
WAVELENGTH (nm)
WITH INFRA-RED CUT FILTER
F I G. 3

METHOD FOR GENERATING VIRTUAL Bv AND Rv SIGNALS

| $G_{13}$ | $B_{23}$ | $G_{33}$ |
|---|---|---|
| $R_{12}$ | $G_{22}$ | $R_{32}$ |
| $G_{11}$ | $B_{21}$ | $G_{31}$ |

COLOR FILTER ARRAY

FIG. 4A

| $G_{13}$ | $B_{23}$ | $G_{33}$ |
|---|---|---|
| $R_{12}$ | $B_{V22}$ | $R_{32}$ |
| $G_{11}$ | $B_{21}$ | $G_{31}$ |

GENERATION OF VIRTUAL Bv

FIG. 4B

| $G_{13}$ | $B_{23}$ | $G_{33}$ |
|---|---|---|
| $R_{12}$ | $R_{V22}$ | $R_{32}$ |
| $G_{11}$ | $B_{21}$ | $G_{31}$ |

GENERATION OF VIRTUAL Rv

FIG. 4C

PATTERNS OF VIRTUAL Bv AND Rv SIGNALS RESULTING FROM FIG.4
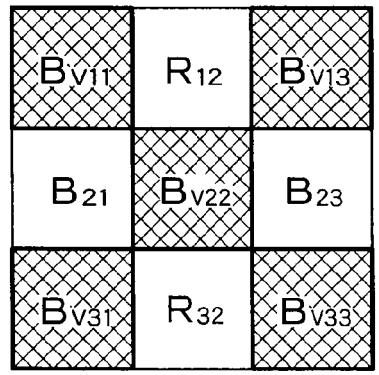
VIRTUAL Bv PATTERN
F I G. 5A
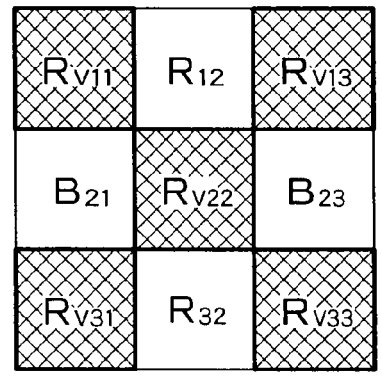
VIRTUAL Rv PATTERN
F I G. 5B
DETAILS OF VIRTUAL PIXEL ARITHMETIC CIRCUIT
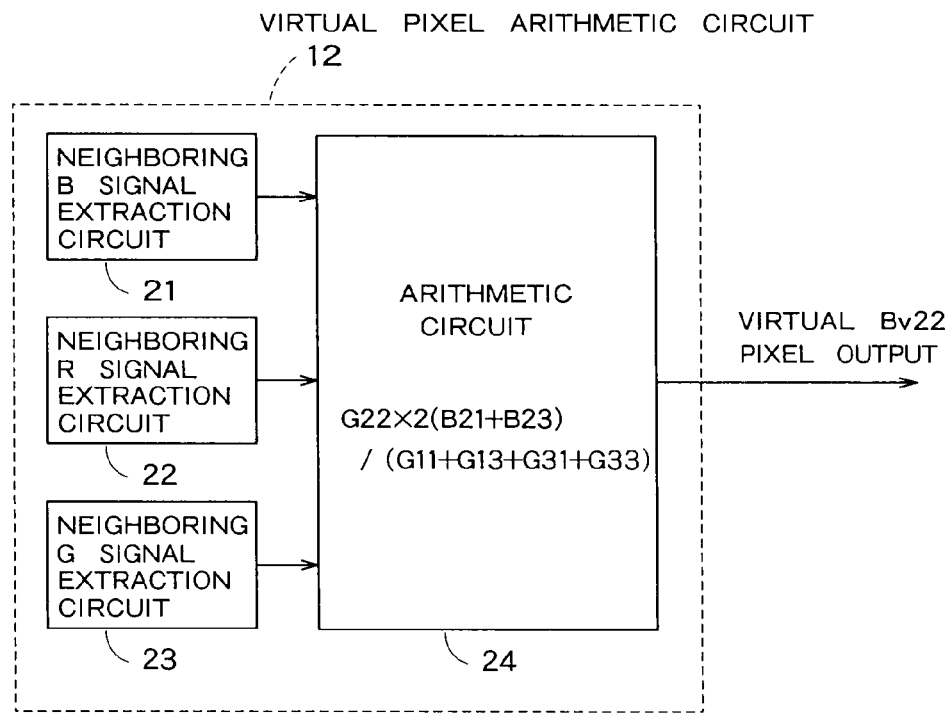
F I G. 6

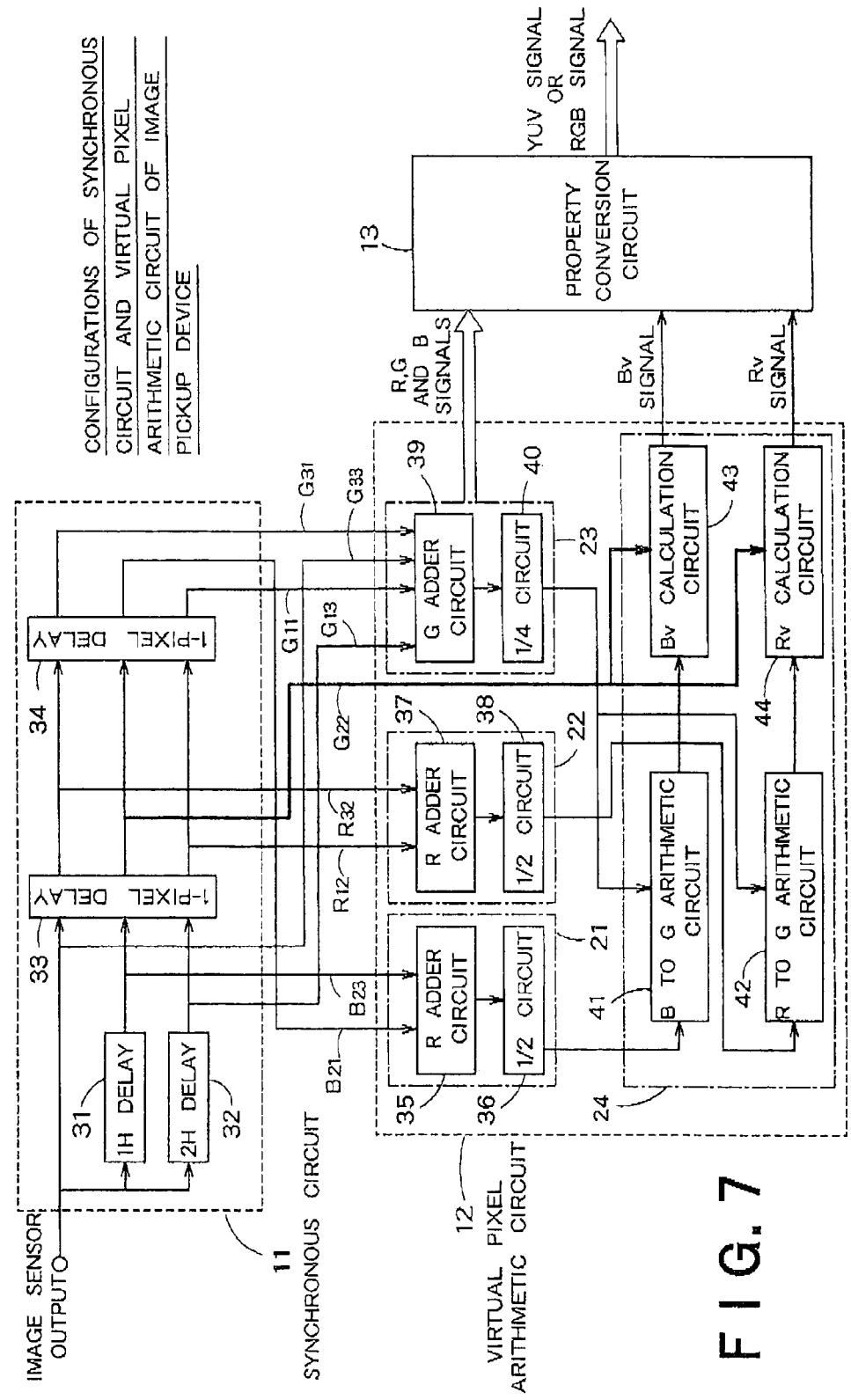
F I G. 7

| Bv |    | Bv |    |
|----|----|----|----|
| B  | Bv | B  | Bv |
| Bv |    | Bv |    |
| B  | Bv | B  | Bv |

FIG. 9A

| Rv | R  | Rv | R  |
|----|----|----|----|
|    | Rv |    | Rv |
| Rv | R  | Rv | R  |
|    | Rv |    | Rv |

FIG. 9B

EXAMPLES OF PIXEL BLOCK OF 3 BY 5 PIXELS

| $G_{11}$ | $R_{12}$ | $G_{13}$ | $R_{14}$ | $G_{15}$ | $R_{16}$ |
|----------|----------|----------|----------|----------|----------|
| $B_{21}$ | $G_{22}$ | $B_{23}$ | $G_{24}$ | $B_{25}$ | $G_{26}$ |
| $G_{31}$ | $R_{32}$ | $G_{33}$ | $R_{34}$ | $G_{35}$ | $R_{36}$ |
| $B_{41}$ | $G_{42}$ | $B_{43}$ | $G_{44}$ | $B_{45}$ | $G_{46}$ |
| $G_{51}$ | $R_{52}$ | $G_{53}$ | $R_{54}$ | $G_{55}$ | $R_{56}$ |
| $B_{61}$ | $G_{62}$ | $B_{63}$ | $G_{64}$ | $B_{65}$ | $G_{66}$ |

FIG. 10

FIG. 12A  COLOR FILTER ARRAY

FIG. 12B  GENERATION OF VIRTUAL Bv

FIG. 12C  GENERATION OF VIRTUAL Rv

ANOTHER METHOD FOR GENERATING VIRTUAL Bv AND Rv SIGNALS

PATTERNS OF VIRTUAL Bv AND Rv SIGNALS RESULTING FROM FIG.12

| $G_{11}$ | $R_{12}$ | $G_{13}$ | $R_{14}$ |
|---|---|---|---|
| $B_{21}$ | $B_{V22}$ | $B_{23}$ | $B_{V24}$ |
| $G_{31}$ | $R_{32}$ | $G_{33}$ | $R_{34}$ |
| $B_{41}$ | $B_{V42}$ | $B_{43}$ | $B_{V44}$ |

VIRTUAL Bv PATTERN

F I G. 13A

| $R_{V11}$ | $R_{12}$ | $R_{V13}$ | $R_{14}$ |
|---|---|---|---|
| $B_{21}$ | $G_{22}$ | $B_{23}$ | $G_{24}$ |
| $R_{V31}$ | $R_{32}$ | $R_{V33}$ | $R_{34}$ |
| $B_{41}$ | $G_{42}$ | $B_{43}$ | $G_{44}$ |

VIRTUAL Rv PATTERN

F I G. 13B

OTHER METHOD FOR GENERATING VIRTUAL Rv AND Bv SIGNALS

FIG. 14A COLOR FILTER ARRAY

FIG. 14B GENERATION OF VIRTUAL Rv

FIG. 14C GENERATION OF VIRTUAL Bv

PATTERNS OF VIRTUAL Rv AND Bv SIGNALS RESULTING FROM FIG.14
VIRTUAL Rv PATTERN
F I G. 15A
VIRTUAL Bv PATTERN
F I G. 15B
B' S PATTERN AND SPATIAL FREQUENCY OF SENSOR WITH W PIXELS
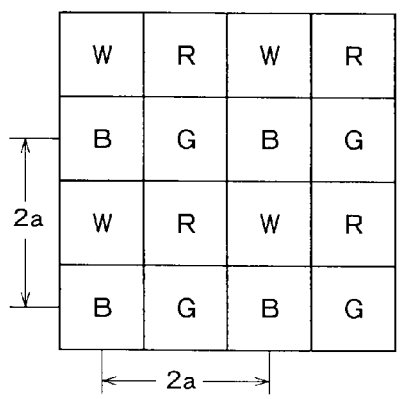
B' S PATTERN
F I G. 16A
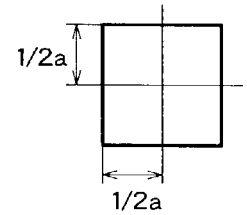
SPATIAL FREQUENCY OF B' S PATTERN
F I G. 16B B'S PATTERN AND SPATIAL FREQUENCY OF SENSOR WITH W PIXELS
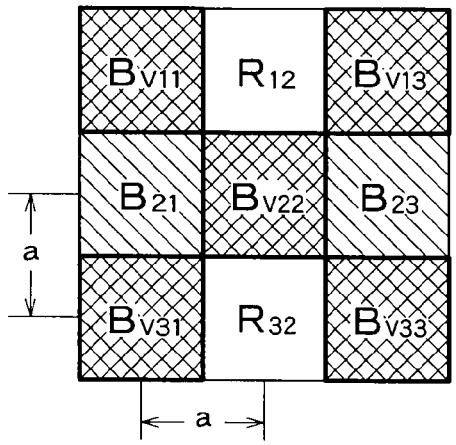
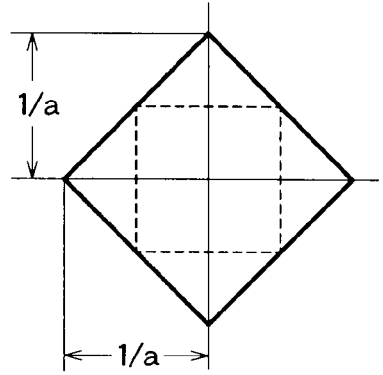
B'S PATTERN
FIG. 17A
SPATIAL FREQUENCY OF B'S PATTERN
FIG. 17B
EXAMPLE OF PIXEL BLOCK OF 3 PIXELS TALL BY 5 PIXELS WIDE
| $G_{11}$ | $R_{12}$ | $G_{13}$ | $R_{14}$ | $G_{15}$ | $R_{16}$ |
| --- | --- | --- | --- | --- | --- |
| $B_{21}$ | $G_{22}$ | $B_{23}$ | $G_{24}$ | $B_{25}$ | $G_{26}$ |
| $G_{31}$ | $R_{32}$ | $G_{33}$ | $R_{34}$ | $G_{35}$ | $R_{36}$ |
| $B_{41}$ | $G_{42}$ | $B_{43}$ | $G_{44}$ | $B_{45}$ | $G_{46}$ |
| $G_{51}$ | $R_{52}$ | $G_{53}$ | $R_{54}$ | $G_{55}$ | $R_{56}$ |
| $B_{61}$ | $G_{62}$ | $B_{63}$ | $G_{64}$ | $B_{65}$ | $G_{66}$ |
FIG. 18

EXAMPLE OF PIXEL BLOCK OF 5 PIXELS TALL BY 3 PIXELS WIDE

| $G_{11}$ | $R_{12}$ | $G_{13}$ | $R_{14}$ | $G_{15}$ | $R_{16}$ |
|---|---|---|---|---|---|
| $B_{21}$ | $G_{22}$ | $B_{23}$ | $G_{24}$ | $B_{25}$ | $G_{26}$ |
| $G_{31}$ | $R_{32}$ | $G_{33}$ | $R_{34}$ | $G_{35}$ | $R_{36}$ |
| $B_{41}$ | $G_{42}$ | $B_{43}$ | $G_{44}$ | $B_{45}$ | $G_{46}$ |
| $G_{51}$ | $R_{52}$ | $G_{53}$ | $R_{54}$ | $G_{55}$ | $R_{56}$ |
| $B_{61}$ | $G_{62}$ | $B_{63}$ | $G_{64}$ | $B_{65}$ | $G_{66}$ |

F I G. 19

IMAGE PICKUP DEVICE AND METHOD FOR PROCESSING AN INTERPOLATED COLOR SIGNAL

CROSS REFERENCE TO RELATED APPLICATIONS

This application is based upon and claims the benefit of priority from the prior Japanese Patent Applications No. 2007-196472, filed on Jul. 27, 2007 and No. 2008-108014, filed on Apr. 17, 2008, the entire contents of which are incorporated herein by reference.

BACKGROUND OF THE INVENTION

1. Field of the Invention

The present invention relates to an image pickup device provided with pixels in a bayer array.

2. Related Art

Conventionally, in a color camera using a CMOS image sensor, it is general to use a color filter of a so-called bayer array in which filters with primary colors of red (R), green (G) and blue (B), hereinafter collectively called RGB, are arranged in a checkerboard pattern. In the bayer array, G pixels are arranged first in a checkerboard pattern and, in the remaining portions, and then R pixels and B pixels are respectively arranged in checkerboard patterns.

On the other hand, an image sensor in order to improve signal to noise ratio by replacing one of the G pixels with a white (W) pixel to increase light transmission has recently been introduced (see Reference Document 1: A novel Bayer-like WRGB color filter array for CMOS image sensors by Hiroto Honda, et al., Proceedings of SPIE-IS&T Electronic Imaging, SPIE Vol. 6492, pp. 64921J-1 to 64921J-10 (2007); Reference Document 2: High Sensitivity Color CMOS Image Sensor with WRGB Color Filter Array and Color Separation Process using Edge Detection by Hiroto Honda, et al., 2007 International Image Sensor Workshop, Jun. 7-10, 2007; and Reference Document 3: News Release from Eastman Kodak, Jun. 14, 2007).

In Reference Document 1 and Reference Document 2, in order to improve signal to noise ratios of RGB signals, RGB pixel values (RW, GW and BW) at the pixel position of W pixels in this color filter array are generated based on the following Equations 1 to 3.

$RW = W \times R\text{-average}/(R\text{-average}+G\text{-average}+B\text{-average})$  Equation 1

$GW = W \times G\text{-average}/(R\text{-average}+G\text{-average}+B\text{-average})$  Equation 2

$BW = W \times B\text{-average}/(R\text{-average}+G\text{-average}+B\text{-average})$  Equation 3

Here, an R-average is calculated by averaging two R pixels neighboring a W pixel. Similarly, a B-average is calculated by averaging two B pixels neighboring the W pixel and a G-average is calculated by averaging four G pixels neighboring the W pixel.

Since Reference Document 1 to Reference Document 3 assume the use of an image sensor having W pixels, the sensor cost is likely to become high. Further, since an existing sensor with a bayer array can not be used, it is likely to take time to gain popularity, and verification of electrical characteristics of the sensor having W pixels is also required. Particularly, there may be also various problems associated with sensitivity differences between W pixels and other pixels and variations in filter characteristics and such.

SUMMARY OF THE INVENTION

The present invention may provide an image pickup device capable of improving signal to noise ratios of color signals and image quality by using an existing sensor in a bayer array.

According to one aspect of the present invention, an image pickup device comprising:

a lens;

first, second and third color filters which are provided by each pixel and arranged in bayer array, the first color filter being arranged in a checkerboard pattern and one of pixels corresponding to the first color filter being used as a reference pixel;

an image sensor which photoelectrically converts lights passing through the first to third filters via the lens to generate a first color signal corresponding to the first color filter, a second color signal corresponding to the second color filter and a third color signal corresponding to the third color filter; and a signal processing part configured to perform signal process for the first to third color signals, wherein the signal processing part includes:

a first color generator configured to generate a fourth color signal corresponding to the reference pixel based on a ratio between the second color signal at a pixel located in vicinity of the reference pixel and the first color signal at a pixel located in vicinity of the reference pixel;

a second color generator configured to generate a fifth color signal corresponding to the reference pixel based on a ratio between the third color signal at a pixel located in vicinity of the reference pixel and the first color signal at a pixel located in vicinity of the reference pixel; and a image quality converter configured to generate color signals by performing a predetermined image process based on the first to fifth color signals.

According to one aspect of the present invention, an image pickup device comprising:

a lens;

first, second and third color filters which are provided by each pixel and arranged in bayer array, the first color filter being arranged in a checkerboard pattern and one of pixels corresponding to the second color filter or the third color filter being used as a reference pixel;

an image sensor which photoelectrically converts lights passing through the first to third filters via the lens to generate a first color signal corresponding to the first color filter, a second color signal corresponding to the second color filter and a third color signal corresponding to the third color filter; and a signal processing part configured to perform signal process for the first to third color signals, wherein the signal processing part includes:

a first color generator configured to generate a fourth color signal corresponding to the reference pixel based on a ratio between the second color signal at a pixel located in vicinity of the reference pixel and the third color signal at a pixel located in vicinity of the reference pixel;

a second color generator configured to generate a fifth color signal corresponding to the reference pixel based on a ratio between the third color signal at a pixel located in vicinity of the reference pixel and the second color signal at a pixel located in vicinity of the reference pixel; and a image quality converter configured to generate color signals by performing a predetermined image process based on the first to fifth color signals.

BRIEF DESCRIPTION OF THE DRAWINGS

FIG. 1 is a block diagram schematically illustrating a configuration of an image pickup device of an embodiment of the present invention;

FIG. 2 is a schematic view illustrating a color arrangement of a color filter array 3 of the embodiment;

FIG. 3 is a graph illustrating spectral sensitivity characteristics of each of color signals used in a single chip color camera;

FIGS. 4A to 4C are schematic views, FIG. 4A showing the color filter array 3 in a bayer array, FIG. 4B illustrating a generation of a virtual pixel Bv22 from a reference pixel G22, and FIG. 4C illustrating a generation of a virtual pixel Rv22 from the reference pixel G22;

FIGS. 5A and 5B are schematic views, FIG. 5A illustrating an array pattern of virtual Bv pixels and FIG. 5B illustrating an array pattern of virtual Rv pixels;

FIG. 6 is a block diagram illustrating an example of an internal structure of a virtual pixel arithmetic circuit 12;

FIG. 7 is a block diagram illustrating an example of a detailed structure of a synchronous circuit 11 and the virtual pixel arithmetic circuit 12 shown in FIG. 1;

FIGS. 9A and 9B are schematic views, FIG. 9A illustrating generated virtual Bv pixels, and FIG. 9B illustrating generated virtual Rv pixels;

FIG. 10 is a schematic view illustrating an example of a pixel block composed of 3 by 5 pixels;

FIGS. 12A to 12C are schematic views to illustrate calculation of virtual pixels only in a horizontal direction;

FIGS. 13A and 13B are schematic views illustrating the result of the processes shown in FIGS. 12A to 12C;

FIGS. 14A to 14C are schematic views to illustrate calculation of virtual pixels only in a vertical direction;

FIGS. 15A and 15B are schematic views illustrating the result of the processes shown in FIGS. 14A to 14C;

FIGS. 16A and 16B are schematic views illustrating a pitch of B pixels of a sensor including W pixels and a spatial frequency thereof;

FIGS. 17A and 17B are schematic views illustrating a pitch of B pixels after virtual pixel calculations of the embodiment and a spatial frequency thereof;

FIG. 18 is a schematic view illustrating to define a pixel block of 3 pixels tall by 5 pixels wide neighboring a reference pixel G33;

FIG. 19 is a schematic view illustrating to define a pixel block of 5 pixels tall by 3 pixels wide neighboring the reference pixel G33;

DETAILED DESCRIPTION OF THE INVENTION

Figure 8:
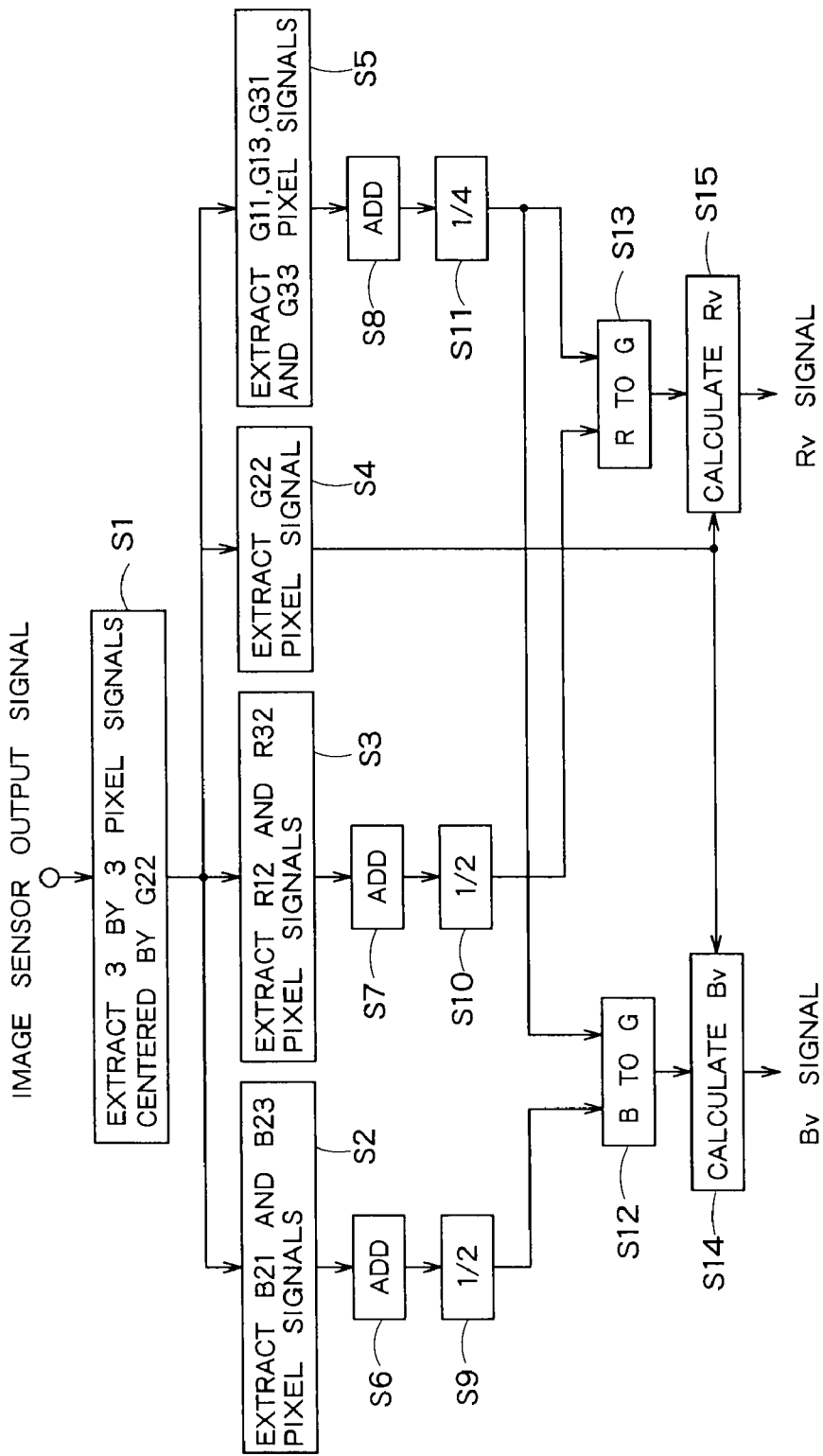
FIG. 8 is a flowchart illustrating an example of a process operation of the virtual pixel arithmetic circuit 12.

Embodiments according to the present invention will now be explained with reference to the accompanying drawings.

FIG. 1 is a block diagram schematically illustrating a configuration of an image pickup device of the embodiment. The image pickup device shown in FIG. 1 is provided with a lens 1, a CMOS image sensor 2 having a photoelectric conversion element for each of pixels, a color filter array 3 disposed over each of the photoelectric conversion elements of the sensor 2, and a signal processing circuit 14.

The signal processing circuit 14 has a synchronous circuit 11 which outputs pixel values in parallel by the unit of a pixel block composed of 3 by 3 pixels, a virtual pixel arithmetic circuit (a first color generating unit and a second color generating unit) 12 described in detail later, a property conversion circuit (an image quality converter) 13 which generates color signals.

An optical image of a photographic subject, passing through the lens 1, is formed on an imaging area of the CMOS image sensor 2. On the imaging area, the color filter array 3 is provided, and light in wavelengths passing through the color filter array 3 are photoelectrically converted by the photoelectric conversion elements to obtain color information.

The output signals from the CMOS image sensor 2 are of RGB signals corresponding to the color filter array 3 and, typically after converted to digital signals by an A/D converter not shown, fed to the signal processing circuit 14.

The RGB signals entered to the signal processing circuit 14 are of dot-sequential signals (serial signals). The synchronous circuit 11 outputs the color signals for 3 by 3 pixels which compose a pixel block in parallel at the same timing. The virtual pixel arithmetic circuit 12 newly generates a virtual R signal and a virtual B signal from the R signal, G signal and B signal and feeds to the property conversion circuit 13.

The property conversion circuit 13 carries out, by using the virtual R signal and the virtual B signal generated by the virtual pixel arithmetic circuit 12 and the color signals fed to the signal processing circuit 14, non-linear processes of matrix calculation, edge correction, gamma correction and such, and outputs the color signals in a signal format of, for example, YUV or RGB.

Next, the virtual pixel arithmetic circuit 12 will be described in detail. FIG. 2 is a schematic view illustrating a color arrangement of the color filter array 3 of the embodiment and FIG. 3 is a graph illustrating spectral sensitivity characteristics of each of the color signals used in a single chip color camera.

The magnitude of each of the RGB color signals output from the image sensor 2 is to be the value obtained by multiplying the wavelength characteristics of the color filter in FIG. 3 by the spectral sensitivity characteristics of the image sensor 2 and integrating by wavelengths. Presently, the spectral sensitivity characteristics of each of the color signals used in most single chip color cameras are in curves as shown in FIG. 3.

Here, since dyes for RGB colors are limited mainly in view of reliability, each of the color characteristics is not of a sharp cutoff and gets into domains of other color characteristics. As shown in FIG. 3, it is particularly significant with a G color filter, other than the intended wavelengths corresponding to G components, R components and B components are substantially infiltrated. Even in a generally used G color filter, the actual wavelength characteristics are of rather broad characteristics and pixels corresponding to the G color filter also contain R and B components.

Meanwhile, since each pixel is provided only with a single color filter and a signal wiring corresponding thereto, from the pixels arranged with G filters, only the G signal is obtained. In a bayer array, since R and B color filters are provided only with half the number of G filters, the amount of signals for the R signal and B signal becomes less than that of the G signal.

Therefore, in the embodiment, when using the color filter 3 in a bayer array, color signals of different colors from the color filter of a reference pixel are defined by analogy in the position of the reference pixel. The pixel analogized as described above is defined as a virtual pixel.

Such processes of the embodiment are based on the facts in that, in general, adjacent pixels have strong correlations in image information and most photographic subjects have broad wavelength characteristics to a certain extent, not formed by the components of a specific wavelength.

FIGS. 4A to 4C are schematic views to illustrate generations of a virtual B signal and a virtual R signal, FIG. 4A showing the color filter array 3 in a bayer array, FIG. 4B illustrating the generation of a virtual pixel Bv22 from a reference pixel G22, and FIG. 4C illustrating the generation of a virtual pixel Rv22 from the reference pixel G22.

First, as shown in FIG. 4B, a method for generating the virtual pixel Bv22 from the reference pixel G22 will be described. In the neighborhood of the reference pixel G22, there exist four pixels of G11, G13, G31 and G33 and two pixels of B21 and B23. The B signal at the position of the reference pixel G22, i.e. the color signal of the virtual pixel Bv22, is not far removed from the color signals of the two B pixels B21 and B23 of adjacent pixels as mentioned above. However, the magnitude of the color signal is not accurately known.

Therefore, in the embodiment, with the magnitude of the color signal of the reference pixel G22 as a reference, by using B signals of the two adjacent pixels B21 and B23 and G signals of the four neighboring pixels G11, G13, G31 and G33, the ratio between B components and G components is calculated to generate the B components at the position of the reference pixel.

More specifically, as shown in the following Equation 4, with the average value of the two B signals of the adjacent pixels B21 and B23 ((B21+B23)/2) and the average value of the four G signals of the adjacent pixels G11, G13, G31 and G33 ((G11+G13+G31+G33)/4), the ratio therebetween (2(B21+B23)/(G11+G13+G31+G33)) is calculated and then multiplied by the G22 signal to define a virtual Bv signal.

$$Bv = G22 \times 2(B21+B23)/(G11+G13+G31+G33) \quad \text{Equation 4}$$

Likewise, as shown in FIG. 4C, a virtual Rv is calculated by using the reference pixel G22. In the neighborhood of the pixel G22, there exist the four G signals of G11, G13, G31 and G33 and two signals of R12 and R32. Therefore, the R signal at the position of the reference pixel G22, i.e. the virtual Rv signal, can be defined, with the magnitude of the G22 signal as a reference and the calculation of the ratio between the neighboring R components and G components, by replacing the G components with the R components. When this calculation is carried out, the virtual Rv signal at the position of the reference pixel G22 is obtained by the following Equation 5.

$$Rv = G22 \times 2(R12+R32)/(G11+G13+G31+G33) \quad \text{Equation 5}$$

By the above Equations 4 and 5, the virtual Bv signal and the virtual Rv signal at the position of the reference pixel G22 are obtained.

Then, by shifting one pixel by one pixel in vertical and horizontal directions, the virtual Bv signal and virtual Rv signal are calculated at the position of the reference pixel G33 of a new pixel block. As shown in FIG. 2, in the neighborhood of the reference pixel G33, there exist four pixels of G22, G24, G42 and G44 and two pixels of R32 and R34. Therefore, the R signal at the position of the reference pixel G33, i.e. the virtual Rv signal, is obtained by the following Equation 6.

$$Rv = G33 \times 2(R32+R34)/(G22+G24+G42+G44) \quad \text{Equation 6}$$

Likewise, the virtual Bv signal is calculated at the position of the reference pixel G33. In the neighborhood of the reference pixel G33, there exist the four pixels of G22, G24, G42 and G44 and two pixels of B23 and B43. Therefore, the B signal at the position of the reference pixel G33, i.e. the virtual Bv signal, is obtained by the following Equation 7.

$$Bv = G33 \times 2(B23+B43)/(G22+G24+G42+G44) \quad \text{Equation 7}$$

By the above Equations 6 and 7, the virtual Rv signal and the virtual Bv signal are obtained at the position of the reference G33.

As described above, at the pixel position of a G pixel (reference pixel) where no R pixel or B pixel exists, with the pixel value of the G pixel itself and the pixel values of neighboring R or B pixels, the virtual R signal and the virtual B signal can be calculated.

Consequently, as shown in FIGS. 5A and 5B, in a pixel block composed of 3 by 3 pixels, respective color signals of five virtual Rv pixels and five virtual Bv pixels can be calculated.

According to this embodiment, since the number of R pixels and B pixels in a pixel block is increased from two pixels each to seven pixels each, color resolutions and signal to noise ratios of the R signal and B signal can be significantly improved.

The abovementioned virtual pixels Rv and Bv are substantially different in physical properties from an apparent pixel Ba generated by an ordinary interpolation process. The differences will be described in detail below.

When assigning B pixel information Ba at the position of the reference pixel G22 shown in FIG. 4A by an ordinary interpolation process, since no B pixel exists at the G22 pixel position, the interpolation process is carried out by the following Equation 8 using the two pixels B21 and B23 adjacent to the G22 pixel.

$$Ba = (B21+B23)/2 \quad \text{Equation 8}$$

The above Equation 8 is simply an averaging process, not adding any new pixel information. The pixel information Ba added by such interpolation process is merely the average of the neighboring B signals of B21 and B23 and the noise contained in the B21 signal and the B23 signal are also averaged, thus never improving the signal to noise ratio.

On the contrary, in the virtual pixel of this embodiment, as shown in Equations 4 to 7 above, the pixel values are calculated directly using the pixel values of the pixel position of the reference pixels G22 and G33 where the virtual Rv signal or the virtual Bv signal are to be generated. Further, not only the average of the neighboring R signals or B signals is calculated, but also the ratio between the average of the neighboring R signals or B signals and the average of the neighboring G signals is calculated.

More specifically, in the embodiment, the virtual pixels Bv and Rv are calculated by multiplying the abovementioned ratio with the pixel value of the reference pixel. Consequently, in the embodiment, rather than obtaining the virtual pixels by averaging the neighboring pixels, the new pixel information is created.

The reasons why the new pixel information can be created by the above procedure are because brightness information is composed of R signal, G signal and B signal and most of images have correlations in horizontal and vertical directions. More specifically, when the brightness of most photographic subjects varies, the R signal, G signal and B signal vary nearly in proportion. Therefore, when one of the RGB signals, for example the G signal, is increased, the remaining R signal and B signal are also increased in most cases, thus it just means that the R signal and the B signal can be generated from the G signal.

Meanwhile, in most of images, the R signal, the G signal and the B signal respectively have, in a two-dimensional space, strong correlations in the horizontal direction and in the vertical direction. Except for special patterns artificially created by computers and such, significant changes of the R signal, G signal and B signal by each of the pixels of the image sensor 2 will never occur. Minute changes express contrast in black and white information and are unlikely to contain color information.

Therefore, it is unlikely that the ratio of the RGB signal components obtained from each of the pixels significantly differs from the ratio of the RGB signal components in the neighborhood thereof. Consequently, the ratios of R to G and B to G are unlikely to change by each of the pixels but gradually change over several pixels.

With the magnitude of the G signal as a reference, by multiplying the ratio between the neighboring B signal and the G signal, while maintaining the brightness information which the G signal contains, the B signal can be created. More specifically, the brightness information is obtained from the G signal and the color information is obtained by calculating the ratio between the neighboring B and G signals and the respective average pixel values. Likewise, with the magnitude of the G signal as a reference, by multiplying the ratio between the neighboring R signal and the G signal, the R signal is created. These calculations are carried out by the virtual pixel arithmetic circuit 12.

FIG. 6 is a block diagram illustrating an example of an internal structure of the virtual pixel arithmetic circuit 12. As shown in the drawing, the virtual pixel arithmetic circuit 12 has a neighboring B signal extraction circuit 21, a neighboring R signal extraction circuit 22, a neighboring G signal extraction circuit 23 and an arithmetic circuit 24. In the below descriptions and in FIG. 6, the reference pixel is defined as G22.

The neighboring B signal extraction circuit 21 extracts signals of two pixels B21 and B23 in the neighborhood of the reference pixel G22 which is a target for generating the virtual R signal and the virtual B signal. The neighboring R signal extraction circuit 22 extracts signals of two pixels R12 and R32 in the neighborhood of the reference pixel G22. The neighboring G signal extraction circuit 23 extracts signals of four pixels G11, G13, G31 and G33 in the neighborhood of the reference pixel G22.

The arithmetic circuit 24 generates, for example, the virtual Bv signal in accordance with Equation 4. Likewise, the arithmetic circuit 24 also generates the virtual Rv signal in accordance with Equation 5.

FIG. 7 is a block diagram illustrating an example of a detailed structure of the synchronous circuit 11 and the virtual pixel arithmetic circuit 12 shown in FIG. 1. As shown in the drawing, the synchronous circuit 11 has a 1H delay circuit 31, a 2H delay circuit 32, and 1-pixel delay circuits 33 and 34. The virtual pixel arithmetic circuit 12 has the neighboring B signal extraction circuit 21, the neighboring R signal extraction circuit 22, the neighboring G signal extraction circuit 23 and the arithmetic circuit 24. The neighboring B signal extraction circuit 21 has a B adder circuit 35 and a halving (½) circuit 36. The neighboring R signal extraction circuit 22 has an R adder circuit 37 and a ½ circuit 38. The neighboring G signal extraction circuit 23 has a G adder circuit 39 and a quartering (¼) circuit 40. The arithmetic circuit 24 has a B to G arithmetic circuit 41, an R to G arithmetic circuit 42, a Bv calculation circuit 43 and an Rv calculation circuit 44.

The synchronous circuit 11 makes output signals from the image sensor 2, depending on the pixel position of the pixel block, delay either 1 line or 2 lines by the 1H delay circuit 31 or the 2H delay circuit 32 and thereafter further delay for one pixel or two pixels by the 1-pixel delay circuits 33 and 34 so as to be processed in parallel by the unit of a pixel block composed of 3 by 3 pixels. Consequently, as shown in FIG. 4, the signals of eight neighboring pixels centered on the reference pixel G22 can be processed simultaneously.

The neighboring B signal extraction circuit 21 in the virtual pixel arithmetic circuit 12 adds the B signals of two pixels neighboring the reference pixel in the B adder circuit 35 and averages the B signals of these two pixels in the ½ circuit 36. Likewise, the neighboring R signal extraction circuit 22 adds the R signals of two pixels neighboring the reference pixel in the R adder circuit 37 and averages the R signals of these two pixels in the ½ circuit 38. Similarly, the neighboring G signal extraction circuit 23 adds the G signals of four pixels neighboring the reference pixel in the G adder circuit 39 and averages the G signals of these four pixels in the ¼ circuit 40.

The B to G arithmetic circuit 41 in the virtual pixel arithmetic circuit 12 calculates the ratio between the average value of the B signals of the two pixels neighboring the reference pixel and the average value of the G signals of the neighboring four pixels. The R to G arithmetic circuit 42 calculates the ratio between the average value of the R signals of the two pixels neighboring the reference pixel and the average value of the G signals of the neighboring four pixels. The Bv calculation circuit 43 outputs the value of the ratio calculated by the B to G arithmetic circuit 41 multiplied by the G signal of the reference pixel G22 as the virtual Bv signal. The Rv calculation circuit 44 outputs the value of the ratio calculated by the R to G arithmetic circuit 42 multiplied by the G signal of the reference pixel G22 as the virtual Rv signal.

The virtual Bv and Rv signals are fed to the property conversion circuit 13 together with the original RGB signals and color signals of YUV or RGB are generated.

When the process for one pixel block is completed, by shifting two pixels in a vertical direction or horizontal direction, with a pixel block of new 3 by 3 pixels as a unit, the virtual Bv and Rv signals corresponding to the reference pixel in the center thereof are calculated.

FIG. 8 is a flowchart illustrating an example of a process operation of the virtual pixel arithmetic circuit 12. First, the RGB signals of the pixel block of 3 by 3 pixels including the reference pixel G22 in the center are extracted (step S1). Next, the processes of extracting the signals of two pixels of B21 and B23 neighboring the reference pixel (step S2), extracting the signals of two pixels of R12 and R32 neighboring the reference pixel (step S3), extracting the G22 signal of the reference pixel (step S4), and extracting the signals of four pixels of G11, G13, G31 and G33 neighboring the reference pixel (step S5) are carried out in parallel.

Then, the processes of adding B21 and B23 signals extracted in the step S2 (step S6), adding R12 and R32 signals extracted in the step S3 (step S7), and adding G11, G13, G31 and G33 signals extracted in the step S5 (step S8) are carried out in parallel.

Next, the processes of averaging the added result in the step S6 by halving (step S9), averaging the added result in the step S7 by halving (step S10), and averaging the added result in the step S8 by quartering (step S11) are carried out in parallel.

Then, the processes of calculating the ratio between the B signals of two pixels neighboring the reference pixel and the G signals of four neighboring pixels (step S12) and calculating the ratio between the R signals of two pixels neighboring the reference pixel and the G signals of four neighboring pixels (step S13) are carried out in parallel.

Thereafter, the processes of calculating the virtual Bv signal by multiplying the calculation result in the step S12 by the G22 signal (step S14) and calculating the virtual Rv signal by multiplying the calculation result in the step S13 by the G22 signal (step S15) are carried out in parallel.

While examples of virtual Rv and Bv pixels are described above, the general expression of the virtual Rv and Bv pixels will be described below.

When the reference pixel Ga,b is located in an even numbered row shown in FIG. 2, i.e. the reference pixel Ga,b is at G22, G24, ..., G42, G44, and so on, the B pixels are calculated by using Ba,b−1 and Ba,b+1 signals of both horizontally adjacent sides of the reference pixel Ga,b and the R pixels are calculated by using Ra−1,b and Ra+1,b signals of both vertically adjacent sides of the reference pixel Ga,b. Therefore, the virtual Rv and the virtual Bv pixels in even numbered rows are expressed by the following Equations 9 and 10.

$$Bv_{a,b}=2G_{a,b}(B_{a,b-1}+B_{a,b+1})/(G_{a-1,b-1}+G_{a-1,b+1}+G_{a+1,b-1}+G_{a+1,b+1}) \quad \text{Equation 9}$$

$$Rv_{a,b}=2G_{a,b}(R_{a-1,b}+R_{a+1,b})/(G_{a-1,b-1}+G_{a-1,b+1}+G_{a+1,b-1}+G_{a+1,b+1}) \quad \text{Equation 10}$$

Meanwhile, when the reference pixel Ga,b is located in an odd numbered row shown in FIG. 2, i.e. the reference pixel Ga,b is at G11, G13, ..., G31, G33, and so on, the B pixels are calculated by using Ba−1,b and Ba+1,b signals of both vertically adjacent sides of the reference pixel Ga,b and the R pixels are calculated by using Ra,b−1 and Ra,b+1 signals of both horizontally adjacent sides of the reference pixel Ga,b. Therefore, the virtual Rv and the virtual Bv pixels in odd numbered rows are expressed by the following Equations 11 and 12.

$$Bv_{a,b}=2G_{a,b}(B_{a-1,b}+B_{a+1,b})/(G_{a-1,b-1}+G_{a-1,b+1}+G_{a+1,b-1}+G_{a+1,b+1}) \quad \text{Equation 11}$$

$$Rv_{a,b}=2G_{a,b}(R_{a,b-1}+R_{a,b+1})/(G_{a-1,b-1}+G_{a-1,b+1}+G_{a+1,b-1}+G_{a+1,b+1}) \quad \text{Equation 12}$$

By generating the virtual Rv and the virtual Bv pixels in accordance with the above Equations 9 to 12, the number of pixels for R and B becomes three times more than that of the original pixels and the signal to noise ratios of the color signals are improved by 9.5 dB.

When generating the virtual Rv and the virtual Bv pixels by the abovementioned method, B pixel components are not assigned, as shown in FIG. 9A, at the R pixels next to the virtual Bv pixels (blank areas shown in the drawing) and, as shown in FIG. 9B, R pixel components are not assigned at the B pixels next to the virtual Rv pixels (blank areas shown in the drawing). In order to assign the R pixel components or the B pixel components to all pixels, the size of the pixel block needs to be expanded larger than 3 by 3 pixels to, for example, 3 by 5 pixels.

For example, with regard to an R34 pixel which is the center of the pixel block of 3 by 5 pixels shown in solid bold line in FIG. 10, an example of generating B pixel components Bv34 will be described hereinafter. In an area of 5 pixels wide and 3 pixels tall centering on the R34, two R pixels and four B pixels are included in addition to the R34 pixel. Therefore, when the ratio is calculated from these six pixels similar to the above equations, the virtual pixel Bv34 at the pixel position of R34 is expressed by the following Equation 13.

$$Bv34=R34(B23+B25+B43+B45)/2(R32+R36) \quad \text{Equation 13}$$

In Equation 13, the virtual pixel Bv34 is generated at the position of the reference pixel by multiplying the ratio between the average value of four B pixels and the average value of two R pixels in the pixel block by the pixel value R34 of the reference pixel.

Likewise, in a pixel block of 3 pixels tall and 5 pixels wide centering on the B23 pixel as shown in a broken line in FIG. 10, two B pixels and four R pixels are included in addition to the B23 pixel. Therefore, when the ratio is calculated from these six pixels similar to the above equations, the signal of the virtual pixel Rv23 at the B23 pixel position is expressed by the following Equation 14.

$$Rv23=B23(R12+R14+R32+R34)/2(B21+B25) \quad \text{Equation 14}$$

While the pixel block of 3 pixels tall by 5 pixels wide is described above, the virtual Rv or the virtual Bv pixels at a reference pixel position may be generated using pixel values in a pixel block of 5 pixels tall by 5 pixels wide centering on the reference pixel shown in FIG. 10. In this case, since the number of R pixels used to generate the virtual Bv34 is increased from two pixels to four pixels, the ratio of B to R can be obtained with a higher signal to noise ratio.

When generating the virtual Rv and the virtual Bv pixels using Equations 13 and 14 for the pixel blocks of 3 by 5 pixels or 5 by 5 pixels, calculations are likely to become complex. As an easier method to avoid such complication, it may be possible to interpolate by averaging the neighboring pixels. For example, the virtual Ba32 at the position of the R32 shown in FIG. 10 can be interpolated by the following Equations 15 or 16. The same can be applied to the virtual Rv.

$$Ba32=(B21+B23+B41+B43)/4 \quad \text{Equation 15}$$

$$Ba32=(G31+G33+G22+G42)/4 \quad \text{Equation 16}$$

Figure 11:
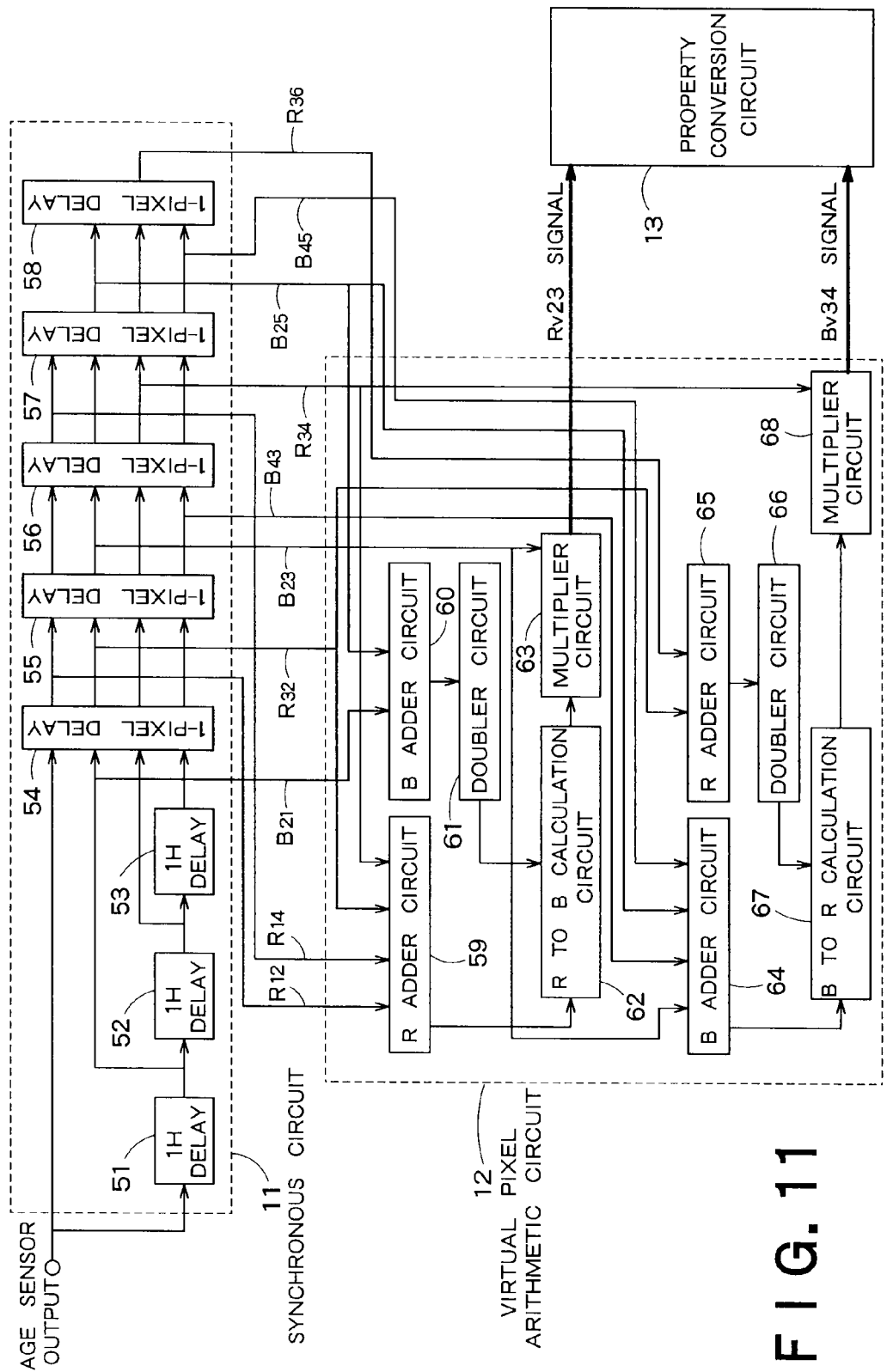
FIG. 11 is a block diagram illustrating an example of an internal structure of the synchronous circuit 11 and the virtual pixel arithmetic circuit 12 to calculate Equations 13 and 14.

The arithmetic processes of Equations 13 and 14 above are carried out by the synchronous circuit 11 and the virtual pixel arithmetic circuit 12 shown in FIG. 1. FIG. 11 is a block diagram illustrating an example of an internal structure of the synchronous circuit 11 and the virtual pixel arithmetic circuit 12 to perform calculations of Equations 13 and 14 above. The synchronous circuit 11 has three cascade coupled 1H delay circuits 51 to 53 and five cascade coupled 1-pixel delay circuits 54 to 58.

The virtual pixel arithmetic circuit 12 has an R adder circuit 59, a B adder circuit 60, a doubler circuit 61, an R to B arithmetic circuit 62 and a multiplier circuit 63 to calculate the virtual Rv pixels; a B adder circuit 64, an R adder circuit 65, a doubler circuit 66, a B to R arithmetic circuit 67 and a multiplier circuit 68 to calculate the virtual Bv pixels; and a property conversion circuit 13.

With an example of generating virtual Rv23 pixel and virtual Bv34 pixel shown in FIG. 10, the operation of circuits shown in FIG. 11 will be described below. The 1H delay circuit 51 outputs a pixel value of B21. The 1H delay circuit 52 outputs a pixel value of G31. The 1H delay circuit 53 outputs a pixel value of B41. The 1-pixel delay circuit 54 outputs respective pixel values of, in an order from the top, R12, G22, R32 and G42. The 1-pixel delay circuit 55 outputs respective pixel values of G13, B23, G33 and B43 in an order from the top. The 1-pixel delay circuit 56 outputs respective pixel values of R14, G24, R34 and G44 in an order from the top. The 1-pixel delay circuit 57 outputs respective pixel values of B25, G35 and B45 in an order from the top. The 1-pixel delay circuit 58 outputs a pixel value of R36.

The R adder circuit 59 calculates (R12+R14+R32+R34). The B adder circuit 60 calculates (B21+B25). The doubler circuit 61 calculates 2(B21+B25). The R to B arithmetic circuit 62 calculates (R12+R14+R32+R34)/2(B21+B25). The multiplier circuit 63 finally calculates Equation 14 to generate the Rv23.

The B adder circuit 64 calculates (B23+B25+B43+B45). The R adder circuit 65 calculates (R32+R36). The doubler circuit 66 calculates 2(R32+R36). The B to R arithmetic circuit 67 calculates (B23+B25+B43+B45)/2(R32+R36). The multiplier circuit 68 finally calculates Equation 13 to generate the Bv34.

The generated virtual Rv23 signal and virtual Bv34 signal are fed into the property conversion circuit 13 and color signals of YUV or RGB are generated.

In the above, an example of calculating an average from both horizontal and vertical directions has been described when the virtual R signals and the virtual B signals are in the neighborhood of the reference G pixel. On the contrary, the calculation of the average may be carried out only in a horizontal direction or in a vertical direction.

FIGS. 12A to 12C are schematic views to illustrate calculation of virtual pixels only in a horizontal direction, FIG. 12A showing a bayer array, FIG. 12B illustrating the generation of a virtual Bv pixel, and FIG. 12C illustrating the generation of a virtual Rv pixel. In the case shown in FIG. 12, at the reference pixel of an each pixel block, only either one of the virtual Rv pixel or the virtual Bv pixel is generated. More specifically, the virtual Rv pixel and the virtual Bv pixel are generated from pixel blocks different from each other. Therefore, as shown in FIG. 13, at the position of original G pixels, the R signals and B signals are alternately defined in the vertical direction. FIG. 13A is a schematic view to illustrate a pixel array of generated virtual Bv pixels and FIG. 13B is a schematic view to illustrate a pixel array of generated virtual Rv pixels.

Meanwhile, FIGS. 14A to 14C illustrate the calculation of virtual pixels only in a vertical direction. Further, in this case, at the reference pixel of an each pixel block, only either one of the virtual Rv pixel or the virtual Bv pixel is generated. Consequently, as shown in FIG. 15, the R signals and B signals are alternately defined in the horizontal direction.

In the cases shown in FIGS. 12 to 15, in a single pixel block, only either one of the virtual Rv pixel or the virtual Bv pixel is generated. More specifically, the pixel block to generate the virtual Rv pixel is different from the pixel block to generate the virtual Bv pixel. In this regard, the abovementioned cases differ from the method which generates both the virtual Rv pixel and the virtual Bv pixel in one pixel block as shown in FIG. 4.

The methods described in reference with FIGS. 12 to 15 have a feature in that the R signal and B signal are easily obtainable when de-mosaicing in consideration of alias signals. More specifically, when obtaining correlations in the vertical direction and the horizontal direction, since the relations of pixels are clear, the process of de-mosaicing can be simplified and interference signals by the generation of aliasing signals are unlikely to occur.

While it is less likely to happen with natural images, there may be a case of taking an image of a photographic subject close to a single wavelength of red or blue in some situations. When taking the image of such subject, in comparison with R signal and B signal, G signal components become extremely small. In this case, when the R signal and B signal are calculated by the abovementioned virtual pixel calculations, the signals may inversely become more noisy. In this case, the abovementioned calculation process may be halted to prevent the signal to noise ratio from lowering. More specifically, by defining a threshold of signal, when G signal becomes a level smaller than a certain level, the abovementioned calculation process may be halted not to generate the virtual Bv and Rv signals. In this case, before performing the process of step S1, a process for determining whether the G signal is equal to or more than a prescribed threshold value is provided. Only when the determination is YES, the process of step S1 and the subsequent processes are performed, and when the determination is NO, the process of step S1 and the subsequent processes are omitted. Alternatively, similar to the above, by comparing the Rv signal and Bv signal with the original R signal and B signal, a selector may be provided not to carry out additions when the signal to noise ratios become lower.

In the above calculations, while the virtual Bv signal and the virtual Rv signal are generated with only eight neighboring pixels of the reference G pixel, the virtual Bv signal and virtual Rv signal may be generated using pixel information in a wider area. The wider the area expanded, the lower the influence of noise can be when averaging while signal levels are small.

In the above descriptions, while the average value of pixels neighboring the reference pixel is calculated and then the ratio is obtained based on the calculation result thereof, in place of calculating simple average values, the ratio may be obtained using the calculation result utilizing weighted additions and other various functions.

While the example of using the CMOS sensor 2 as the image sensor 2 is illustrated in the above, the same process can also be applied when a CCD having a color filter of a bayer method is used.

As described above, the embodiment of the present invention has significant characteristics in that, at the pixel position where a color filter of a specific color is not provided, the color information of the specific color thereof can be added. Consequently, the color resolution is improved and the signal to noise ratio of the color signals can be improved.

Further, in the embodiment, since the ordinary image sensor 2 in a bayer array is used, not the special image sensor provided with W pixels, color images of good color characteristics and of a good color reproducibility can be obtained.

Furthermore, while the simple interpolation process in related art merely averages pixels, hence not generating new pixels, in the embodiment, since averaging is not simply carried out, the effect in that the new pixels in other colors can be generated at the position of the reference pixel is obtained.

Now, the effects of the embodiment will be more specifically described.

(1) When the image sensor 2 is of a WRGB array, the level of incoming light is limited by W, thus the signal to noise ratio in standard condition is lowered. On the contrary, in the embodiment, since the RGB array is adopted, the balance of signal outputs becomes better and the signal to noise ratios even in standard condition can be improved to the extent that there are no W pixels.

(2) When using the W pixels, since the R+G+B signals obtained by color filters will not make W signal in a strict sense, even if RGB signals are obtained by calculation, the correct RGB signals are not obtainable. On the contrary, in the embodiment, since R and B signals are calculated based on the correct G signal, the RGB signals in correct characteristics are obtained and the color reproducibility can be improved.

(3) Since the G signal is directly obtained, not by generating virtual G, similar to a bayer method in related art, the G components of good accuracy is obtained and the correct G signal is obtainable. Therefore, the G signal of an accurate spectroscopic characterization is obtained and the color reproducibility is improved. Further, an excellent color reproducibility equivalent to that of a bayer method is maintained.

(4) R and B signals can be equally calculated.

In the case of W pixels, since R signal is obtained by horizontally averaging and B signal is obtained by vertically averaging, while there is a possibility that errors occur when there are correlations in the vertical direction and horizontal direction, the errors can be reduced by respectively calculating virtual Rv signals and virtual Bv signals with the average of adjacent R signals and adjacent B signals in the horizontal direction.

Likewise, the errors can be reduced by respectively calculating virtual Rv signals and virtual Bv signals with the average of adjacent R signals and the average of adjacent B signals in the vertical direction.

FIGS. 16A and 16B are schematic views illustrating a pitch of B pixels of a sensor including W pixels and a spatial frequency thereof and FIGS. 17A and 17B are schematic views illustrating a pitch of B pixels after virtual pixel calculations of the embodiment and a spatial frequency thereof.

In a conventional bayer method, since B pixels are disposed, as shown in FIG. 16A, at a pitch of 2 a horizontally and vertically, the spatial frequency is distributed, as shown in FIG. 16B, over the square range of ½ a both horizontally and vertically.

On the contrary, according to the embodiment, as shown in FIG. 17A, the number of B Pixels are practically increased and, similar to G pixels, diagonal components are increased. Since the pitch of B pixels becomes a, the spatial frequency is, as shown in FIG. 17B, distributed over the square range of 1/a both horizontally and vertically. The broken line shown in FIG. 17B represents the spatial frequency shown in FIG. 16B and it can be found that the spatial frequency is extended. Consequently, according to the embodiment, an improvement of resolution can be achieved.

Furthermore, in an image pickup device of a bayer method in related art, generation of color alias signals has been a major problem. In a bayer array, since G pixels of twice the number of R or B pixels are disposed in a checkerboard pattern, while the spatial frequency of G signal is distributed in a wide range similar to that shown in FIG. 17B, those of R and B signals are in a narrow range as shown in FIG. 16B and in a different square shape. Therefore, characteristics between R and B signals and G signal are different, making it difficult to design an optical LPF. When the design of the optical LPF is tailored to G signals, substantial amount of alias signals of R and B signals are increased and significantly degrade the image quality. When the cut-off frequency of the optical LPF is lowered tailoring to R and B signals, there have been drawbacks in that the overall resolution is lowered and a clear image is not obtainable.

On the contrary, according to the embodiment, since the shape of the spatial frequencies of each of the R, G, and B signals becomes equivalent, the generation of alias signals associated with sampling becomes equivalent. Consequently, the embodiment has significant effects in that the designing of the optical LPF becomes easier, generation of alias signals becomes small as the alias signals can be almost completely removed, and the image quality is significantly improved. Further, since the cut-off frequency of the optical LPF can be set higher, the embodiment has significant features in that the resolution of color image is improved and a clear image is obtainable.

In the abovementioned Equations 4 to 7, while pixel values in the pixel block of 3 by 3 pixels neighboring the center pixel are used when generating virtual Bv signals and virtual Rv signals, by expanding the size of the pixel block to either of 3 by 5 pixels or 5 by 5 pixels, the signal to noise ratios in ratio calculations can be improved. However, while the size of the pixel block is set large, there is a drawback in that errors may increase when image greatly varies. Therefore, it may be configured to select how large the size of the pixel block is to be set according to the contents of an image.

For example, FIG. 18 is a schematic view to illustrate defining a pixel block of 3 pixels tall by 5 pixels wide neighboring the reference pixel G33. The virtual pixels Bv33 and Rv33 at the position of the reference pixel G33 are expressed by the following Equations 17 and 18.

$$Bv33=G33(B21+B23+B25+B41+B43+B45)/(G22+G24+G31+G35+G42+G44) \quad \text{Equation 17}$$

$$Rv33=3G33(R32+R34)/(G22+G24+G31+G35+G42+G44) \quad \text{Equation 18}$$

In the above Equation 17, the virtual Bv33 pixel is generated by multiplying the ratio between the average value of six B pixels and the average value of six G pixels in the pixel block by the reference pixel G33.

In the above Equation 18, the virtual Rv33 pixel is generated by multiplying the ratio between the average value of two R pixels and the average value of six G pixels in the pixel block by the reference pixel G33.

In the virtual Bv33 pixel, since the ratio is calculated by using the average value of B signals for six pixels, the signal to noise ratio of the B to G ratio becomes approximately 6 dB better than that of the virtual Rv33 pixel which uses the average value of R signals for two pixels.

For the virtual Rv33 pixel, when pixel values are calculated based on the pixel block shown by a solid bold line in FIG. 19, the ratio can be calculated by using the average value of R signals for six pixels. Therefore, a similar signal to noise ratio to that of the virtual Bv33 pixel by Equation 17 can be obtained.

For example, based on the pixel block of 5 pixels tall by 3 pixels wide shown by the solid bold line in FIG. 19, the virtual pixels Bv33 and Rv33 at the position of the reference pixel G33 are expressed by following Equations 19 and 20.

$$Bv33=3G33(B23+B43)/(G13+G22+G24+G42+G44+G53) \quad \text{Equation 19}$$

$$Rv33=G33(R12+R14+R32+R34+R52+R54)/(G13+G22+G24+G42+G44+G53) \quad \text{Equation 20}$$

As described above, the pixel block can be either of 3 pixels tall by 5 pixels wide or 5 pixels tall by 3 pixels wide, hence the size of the pixel block may be determined depending on the reference pixel being in an odd row or an even row. It is conceivable that, for example, when the reference pixel is in an odd row, since there are B pixels above and below in the vertical direction, the pixel block of 3 pixels tall by 5 pixels wide is to be used for the calculation of the virtual Bv signals and, for the calculation of the virtual Rv signals, since there are R pixels on left and right in the horizontal direction, the pixel block of 5 pixels tall by 3 pixels wide is to be used. Meanwhile, when the reference pixel is in an even row, since there are R pixels above and below in the vertical direction, the pixel block of 3 pixels tall by 5 pixels wide is to be used for the calculation of the virtual Rv signals and, for the calculation of the virtual Bv signals, since there are B pixels on left and right in the horizontal direction, the pixel block of 5 pixels tall by 3 pixels wide is to be used. Consequently, the virtual Rv signals and virtual Bv signals can be efficiently generated with less number of pixels.

Figure 20:
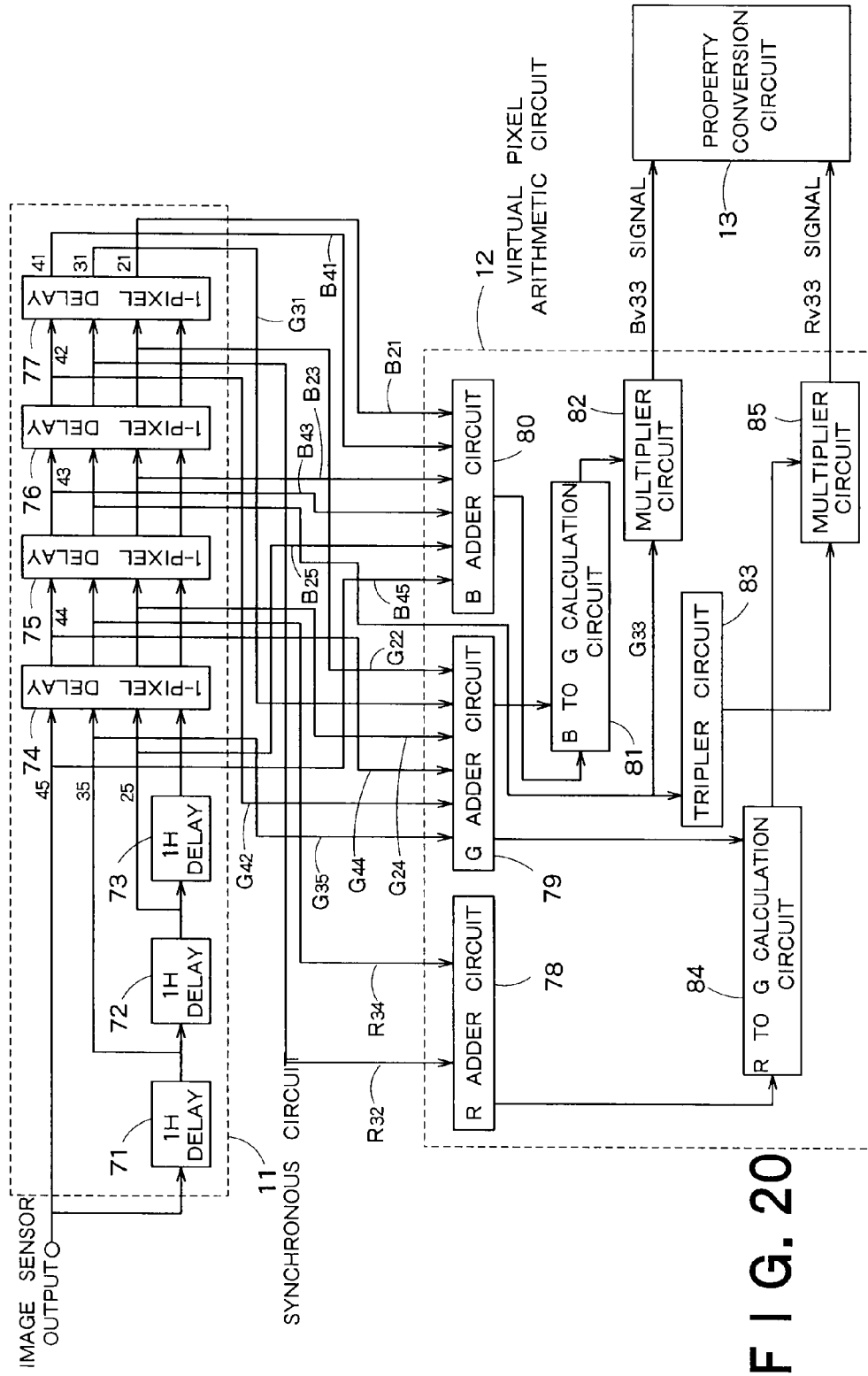
FIG. 20 is a block diagram illustrating an example of internal structure of the synchronous circuit 11 and the virtual pixel arithmetic circuit 12 to perform calculations of Equations 17 and 18.

FIG. 20 is a block diagram illustrating an example of an internal structure of the synchronous circuit 11 and the virtual pixel arithmetic circuit 12 to calculate the above Equations 17 and 18. The synchronous circuit 11 shown in FIG. 20 has cascade coupled 1H delay circuits 71 to 73 and cascade coupled 1-pixel delay circuits 74 and 77. The virtual pixel arithmetic circuit 12 has an R adder circuit 78, a G adder circuit 79, a B adder circuit 80, a B to G calculation circuit 81, a multiplier circuit 82, a tripler circuit 83, an R to G calculation circuit 84 and a multiplier circuit 85. The multiplier circuit 82 outputs the Bv33 signal of the calculation result of Equation 17 and the multiplier circuit 85 outputs the Rv33 signal of the calculation result of Equation 18.

Figure 21:
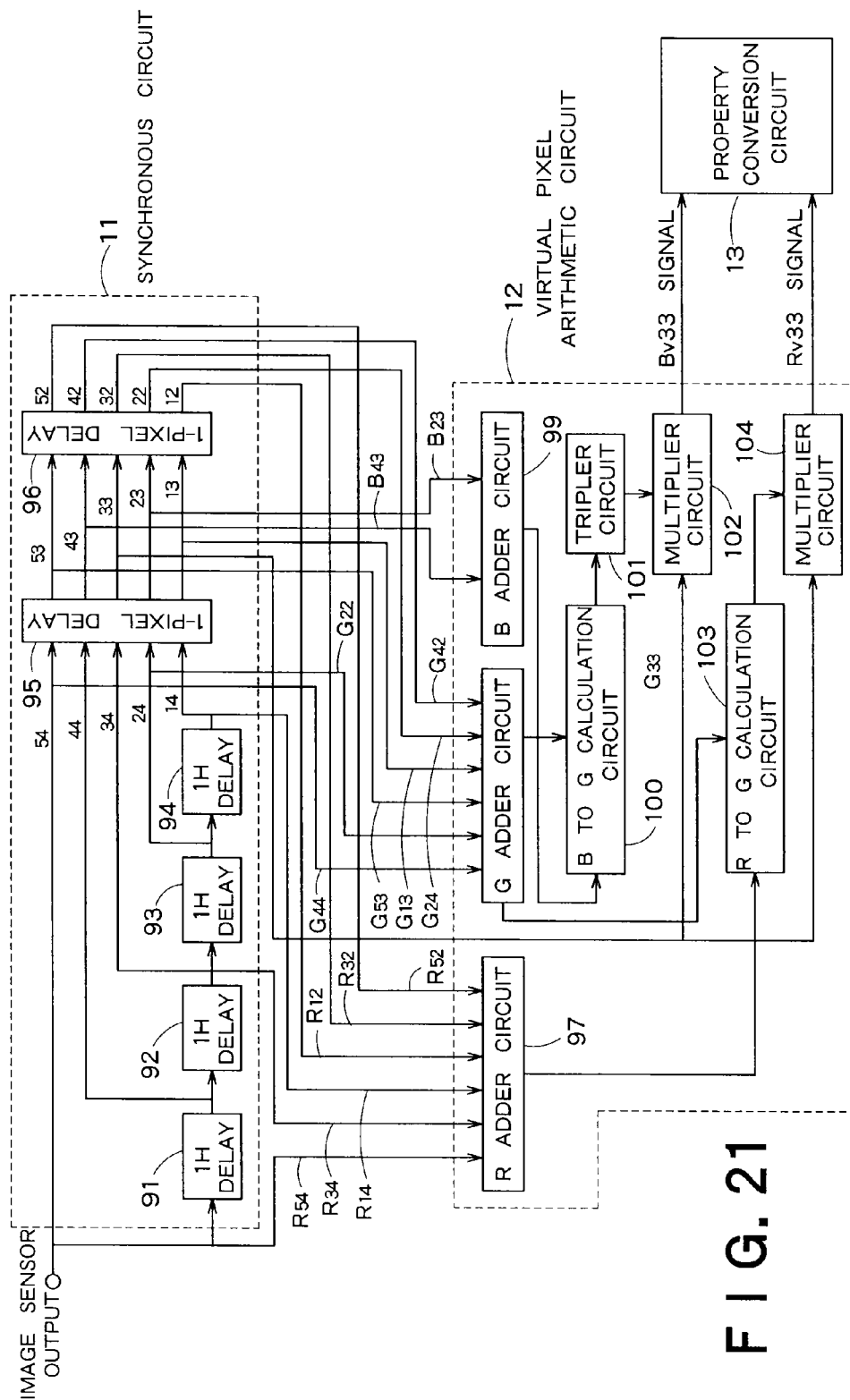
FIG. 21 is a block diagram illustrating an example of internal structure of the synchronous circuit 11 and the virtual pixel arithmetic circuit 12 to perform calculations of Equations 19 and 20.

FIG. 21 is a block diagram illustrating an example of an internal structure of the synchronous circuit 11 and the virtual pixel arithmetic circuit 12 to calculate the above Equations 19 and 20. The synchronous circuit 11 shown in FIG. 21 has cascade coupled 1H delay circuits 91 to 94 and cascade coupled 1-pixel delay circuits 95 and 96. The virtual pixel arithmetic circuit 12 has an R adder circuit 97, a G adder circuit 98, a B adder circuit 99, a B to G calculation circuit 100, a tripler circuit 101, a multiplier circuit 102, an R to G calculation circuit 103 and a multiplier circuit 104. The multiplier circuit 102 outputs the Bv33 signal of the calculation result of Equation 19 and the multiplier circuit 104 outputs the Rv33 signal of the calculation result of Equation 20.

The internal structures of the synchronous circuit 11 and the virtual pixel arithmetic circuit 12 to generate virtual pixels are not limited to those shown in FIGS. 7, 11, 20 and 21.

The invention claimed is:

1. An image pickup device comprising:
a lens;
first, second and third color filters which are provided by each pixel and arranged in a bayer array, the first color filter being arranged in a checkerboard pattern and one pixel of pixels corresponding to the first color filter being used as a reference pixel;
an image sensor which photoelectrically converts light passing through the first to third filters via the lens to generate a first color signal corresponding to the first color filter, a second color signal corresponding to the second color filter and a third color signal corresponding to the third color filter; and
a signal processing part configured to perform a signal process for the first to third color signals,
wherein the signal processing part includes
a first color generator configured to generate a fourth color signal corresponding to the reference pixel by multiplying a ratio between
(i) an average of the second color signals at a plurality of pixels located in the vicinity of the reference pixel and
(ii) an average of the first color signals at a plurality of pixels located in the vicinity of the reference pixel
by the first color signal at the reference pixel;
a second color generator configured to generate a fifth color signal corresponding to the reference pixel by multiplying
(i) a ratio between an average of the third color signals at a plurality of pixels located in the vicinity of the reference pixel and
(ii) an average of the first color signals at a plurality of pixels located in the vicinity of the reference pixel
by the first color signal at the reference pixel; and
a image quality converter configured to generate color signals by performing a predetermined image process based on the first to fifth color signals.

2. The image pickup device according to claim 1, wherein:
the first color generator calculates, by each image block including a plurality of pixels in each of vertical and horizontal directions, a ratio between an average of the second color signals at plurality of pixels in the pixel block and an average of the first color signals at a plurality of pixels except for the reference pixel in the pixel block; and
the second color generator calculates, by each image block, a ratio between an average of the third color signals at a plurality of pixels in the pixel block and an average of the first color signals at a plurality of pixels in the pixel block.

3. The image pickup device according to claim 2, wherein:
the first color generator calculates a ratio between an average of the second color signals at two pixels neighboring the reference pixel in left and right directions and an average of the first color signals at four pixels neighboring the reference pixel; and
the second color generator calculates a ratio between an average of the third color signals at two pixels neighboring the reference pixel in left and right directions and an average of the first color signals at four pixels neighboring the reference pixel.

4. The image pickup device according to claim 2, wherein:
the first color generator calculates a ratio between an average of the second color signals at two pixels neighboring the reference pixel in upper and lower directions and an average of the first color signals at four pixels neighboring the reference pixel; and
the second color generator calculates a ratio between an average of the third color signals at two pixels neighboring the reference pixel in upper and lower directions and an average of the first color signals of four pixels neighboring the reference pixel.

5. The image pickup device according to claim 3, wherein the first color generator and the second color generator calculate the ratio by using reference pixels different from each other.

6. The image pickup device according to claim 2, wherein the first color generator and the second color generator calculate the ratio by each image block generated by shifting two pixels in vertical or horizontal directions or by shifting one pixel by one pixel in vertical and horizontal direction.

7. The image pickup device according to claim 2, wherein the first color generator calculates a ratio between an average of the second color signals at six pixels in a line or a column neighboring a line or a column where the reference pixel exists in the pixel block and an average of the first color signals at six pixels in the pixel block.

8. The image pickup device according to claim 2, wherein the first color generator calculates a ratio between an average of the second color signals at two pixels neighboring both sides by sandwiching the reference pixel in a line or a column where the reference pixel exists in the pixel block and an average of the first color signals at six pixels in the pixel block.

9. The image pickup device according to claim 2, wherein the second color generator calculates a ratio between an average of the third color signals at six pixels in a line or a column neighboring a line or a column where the reference pixel exists in the pixel block and an average of the first color signals at six pixels in the pixel block.

10. The image pickup device according to claim 2, wherein the second color generator calculates a ratio between an average of the third color signals at two pixels neighboring both sides by sandwiching the reference pixel in a line or a column where the reference pixel exists in the pixel block and an average of the first color signals at six pixels in the pixel block.

11. The image pickup device according to claim 2, further comprising a reference pixel level determination part configured to determine whether a level of the first color signal at the reference pixel is equal to or more than a predetermined threshold value, wherein the first color generator calculates the fourth color signal only when the level of the first color signal at the reference pixel is equal to or more than the threshold value; and the second color generator calculates the fifth color signal only when the level of the first color signal at the reference pixel is equal to or more than the threshold value.

12. An image pickup device comprising:

a lens;

first, second and third color filters which are provided by each pixel and arranged in a bayer array, the first color filter being arranged in a checkerboard pattern and one pixel of pixels corresponding to the second color filter or the third color filter being used as a reference pixel;

an image sensor which photoelectrically converts light passing through the first to third filters via the lens to generate a first color signal corresponding to the first color filter, a second color signal corresponding to the second color filter and a third color signal corresponding to the third color filter; and a signal processing part configured to perform a signal process for the first to third color signals, wherein the signal processing part includes:

a first color generator configured to generate a fourth color signal corresponding to the reference pixel based on a ratio between the second color signal at a pixel located in the vicinity of the reference pixel and the third color signal at a pixel located in the vicinity of the reference pixel;

a second color generator configured to generate a fifth color signal corresponding to the reference pixel based on a ratio between the third color signal at a pixel located in the vicinity of the reference pixel and the second color signal at a pixel located in the vicinity of the reference pixel; and a image quality converter configured to generate color signals by performing a predetermined image process based on the first to fifth color signals.

13. The image pickup device according to claim 12, wherein:

the first color generator multiplies a ratio between an average of the second color signals at a plurality of pixels located in the vicinity of the reference pixel and an average of the third color signals at a plurality of pixels located in the vicinity of the reference pixel by the third color signal at the reference pixel to calculate the fourth color signal corresponding to the reference pixel; and the second color generator multiplies a ratio between an average of the third color signals at a plurality of pixels located in the vicinity of the reference pixel and an average of the second color signals at a plurality of pixels located in the vicinity of the reference pixel by the second color signal at the reference pixel to calculate the fifth color signal corresponding to the reference pixel.

14. An image pickup method of an image pickup device including a lens;

first, second and third color filters which are provided by each pixel and arranged in a bayer array, the first color filter being arranged in a checkerboard pattern and one pixel of pixels corresponding to the first color filter being used as a reference pixel;

an image sensor which photoelectrically converts lights passing through the first to third filters via the lens to generate a first color signal corresponding to the first color filter, a second color signal corresponding to the second color filter and a third color signal corresponding to the third color filter; and a signal processing part configured to perform a signal process for the first to third color signals, wherein the image pickup method comprises:

generating a fourth color signal corresponding to the reference pixel by multiplying
  (i) a ratio between an average of the second color signals at a plurality of pixels located in the vicinity of the reference pixel and
  (ii) an average of the first color signals at a plurality of pixels located in the vicinity of the reference pixel
by the first color signal at the reference pixel;

generating a fifth color signal corresponding to the reference pixel by multiplying
  (i) a ratio between an average of the third color signals at a plurality of pixels located in the vicinity of the reference pixel and
  (ii) an average of the first color signals at a plurality of pixels located in the vicinity of the reference pixel
by the first color signal at the reference pixel; and generating color signals by performing a predetermined image process based on the first to fifth color signals.

15. The image pickup method according to claim 14, wherein:

the generating the fourth color signal calculates, by each image block including a plurality of pixels in each of vertical and horizontal directions, a ratio between an average of the second color signals at plurality of pixels in the pixel block and an average of the first color signals at a plurality of pixels except for the reference pixel in the pixel block; and the generating the fifth color signal calculates, by each image block, a ratio between an average of the third color signals at a plurality of pixels in the pixel block and an average of the first color signals at a plurality of pixels in the pixel block.

16. The image pickup method according to claim 15, wherein:

the generating the fourth color signal calculates a ratio between an average of the second color signals at two pixels neighboring the reference pixel in left and right directions and an average of the first color signals at four pixels neighboring the reference pixel; and the generating the fifth color signal calculates a ratio between an average of the third color signals at two pixels neighboring the reference pixel in left and right directions and an average of the first color signals at four pixels neighboring the reference pixel.

17. The image pickup method according to claim 16, wherein the generating the fourth color signal and the generating the fifth color signal calculate the ratio by using the reference pixels different from each other.

18. The image pickup method according to claim 15, wherein:

the generating the fourth color signal calculates a ratio between an average of the second color signals at two pixels neighboring the reference pixel in upper and lower directions and an average of the first color signals at four pixels neighboring the reference pixel; and the generating the fifth color signal calculates a ratio between an average of the third color signals at two pixels neighboring the reference pixel in upper and lower directions and an average of the first color signals of four pixels neighboring the reference pixel.

* * * * *